US011950213B2

(12) United States Patent
Andresky et al.

(10) Patent No.: US 11,950,213 B2
(45) Date of Patent: Apr. 2, 2024

(54) CONTROLLING DEPLOYMENT OF IOT DEVICES OVER WIRELESS NETWORKS WITH AN ADAPTIVE GATEWAY

(71) Applicant: DISH Wireless L.L.C., Englewood, CO (US)

(72) Inventors: David Andresky, Lafayette, CO (US); Richard Reisbick, Westminster, CO (US)

(73) Assignee: DISH Wireless L.L.C., Littleton, CO (US)

( * ) Notice: Subject to any disclaimer, the term of this patent is extended or adjusted under 35 U.S.C. 154(b) by 429 days.

(21) Appl. No.: 17/180,361

(22) Filed: Feb. 19, 2021

(65) Prior Publication Data

US 2021/0266894 A1 Aug. 26, 2021

Related U.S. Application Data

(60) Provisional application No. 62/980,025, filed on Feb. 21, 2020.

(51) Int. Cl.
*H04W 72/04* (2023.01)
*H04W 72/0446* (2023.01)
(Continued)

(52) U.S. Cl.
CPC ........ *H04W 72/0446* (2013.01); *H04W 84/18* (2013.01); *H04W 88/16* (2013.01)

(58) Field of Classification Search
CPC .. H04W 72/0446; H04W 84/18; H04W 88/16
See application file for complete search history.

(56) References Cited

U.S. PATENT DOCUMENTS

| 2009/0310571 A1 | 12/2009 | Matischek et al. |
| 2016/0135109 A1* | 5/2016 | Hampel ................. H04W 40/22 370/315 |
| 2022/0070801 A1* | 3/2022 | Satoh ...................... G08C 15/06 |

FOREIGN PATENT DOCUMENTS

WO    2018/208291 A1    11/2018

OTHER PUBLICATIONS

Huaming Li et al., "Heartbeat-Driven Medium-Access Control for Body Sensor Networks", IEEE Transactions on Information Technology in Biomedicine, IEEE Service Center, Los Alamitos, CA, US, vol. 13, No. 1, Jan. 1, 2010, pp. 44-51, XP011295566, ISSN: 1089-7771 abstract.

(Continued)

*Primary Examiner* — Melvin C Marcelo
(74) *Attorney, Agent, or Firm* — Kilpatrick Townsend & Stockton LLP

(57) ABSTRACT

Systems, machine-readable media, and methods to control deployment of IoT devices over wireless networks with an adaptive gateway are provided. A gateway device may broadcast on different channels in a first time slot of a time interval. The gateway device may receive a response from a sensor device in a second time slot of the time interval. The gateway device may further communicate to the sensor device in a third time slot of the time interval. The gateway device may receive transmissions from the sensor device in one or more subsequent instances of the fourth time slot of the time interval. Based at least in part on the one or more transmissions from the sensor device, the gateway device may transmit data to one or more computer systems via one or more networks.

20 Claims, 9 Drawing Sheets

(51) Int. Cl.
*H04W 84/18* (2009.01)
*H04W 88/16* (2009.01)

(56) References Cited

OTHER PUBLICATIONS

International Search Report and Written Opinion for PCT/US2021/018841 dated Jun. 2, 2021, all pages.

\* cited by examiner

CONTROLLING DEPLOYMENT OF IOT DEVICES OVER WIRELESS NETWORKS WITH AN ADAPTIVE GATEWAY

CROSS-REFERENCE TO RELATED APPLICATION

This application claims the benefit of and priority to U.S. Provisional Application No. 62/980,025, filed on Feb. 21, 2020, the contents of which are hereby incorporated by reference in their entirety for all purposes.

TECHNICAL FIELD

This disclosure generally relates to Internet of Things (IoT), and more particularly to controlling deployment of IoT devices over wireless networks with an adaptive gateway.

BACKGROUND

The development of IoT devices and associated applications and services may be a complex proposition. Fully realizing the potential for IoT devices in various applications may present a number of challenges and problems involving field devices, edge devices, network operations/management software, security, device management, and more. There is a need for systems, devices, and methods that address the challenges and problems encumbering development and deployment of IoT devices. This and other needs are addressed by the present disclosure.

BRIEF SUMMARY

Certain embodiments of the present disclosure relate generally to IoT, and more particularly to controlling deployment of IoT devices over wireless networks with an adaptive gateway.

In one aspect, a system to control deployment of sensor devices over wireless networks. The system may include one or more processing devices and memory communicatively coupled with and readable by the one or more processing devices and having stored therein processor-readable instructions which, when executed by the one or more processing devices, cause the one or more processing devices to perform one or a combination of the following operations. Broadcasting of a first electronic communication on one or more channels of a plurality of different channels may be caused, where the first electronic communication may be broadcasted in a first time slot of a time interval. A second electronic communication from a sensor device in response to the broadcasting of the first electronic communication may be processed, where the second electronic communication may be received in a second time slot of the time interval. Transmitting of a third electronic communication to the sensor device in response to the second electronic communication may be caused. The third electronic communication may be transmitted in a third time slot of the time interval. The third electronic communication may include an indication of an assignment of a fourth time slot of the time interval to the sensor device. One or more transmissions from the sensor device in one or more subsequent instances of the fourth time slot of the time interval may be processed. Based at least in part on the one or more transmissions from the sensor device, transmitting of data to one or more computer systems via one or more networks may be caused.

In another aspect, one or more non-transitory, machine-readable media storing instructions, which, when executed by one or more processing devices, cause the one or more processing devices to perform one or a combination of the following operations. Broadcasting of a first electronic communication on one or more channels of a plurality of different channels may be caused, where the first electronic communication may be broadcasted in a first time slot of a time interval. A second electronic communication from a sensor device in response to the broadcasting of the first electronic communication may be processed, where the second electronic communication may be received in a second time slot of the time interval. Transmitting of a third electronic communication to the sensor device in response to the second electronic communication may be caused. The third electronic communication may be transmitted in a third time slot of the time interval. The third electronic communication may include an indication of an assignment of a fourth time slot of the time interval to the sensor device. One or more transmissions from the sensor device in one or more subsequent instances of the fourth time slot of the time interval may be processed. Based at least in part on the one or more transmissions from the sensor device, transmitting of data to one or more computer systems via one or more networks may be caused.

In yet another aspect, a method for controlling deployment of sensor devices over wireless networks. The method may include one or a combination of the following. A gateway device may broadcast a first electronic communication on one or more channels of a plurality of different channels, where the first electronic communication may be broadcasted in a first time slot of a time interval. The gateway device may receive a second electronic communication from a sensor device in response to the broadcasting of the first electronic communication, where the second electronic communication may be received in a second time slot of the time interval. The gateway device may transmit a third electronic communication to the sensor device in response to the second electronic communication. The third electronic communication may be transmitted in a third time slot of the time interval. The third electronic communication may include an indication of an assignment of a fourth time slot of the time interval to the sensor device. The gateway device may receive one or more transmissions from the sensor device in one or more subsequent instances of the fourth time slot of the time interval. Based at least in part on the one or more transmissions from the sensor device, the gateway device may transmit data to one or more computer systems via one or more networks.

In various embodiments, the processing the one or more transmissions from the sensor device in the one or more subsequent instances of the fourth time slot of the time interval may include processing a plurality of transmissions from the sensor device in a plurality of subsequent instances of the fourth time slot of the time interval. Each transmission of the plurality of transmissions may be received in a respective subsequent instance of the plurality of subsequent instances of the fourth time slot of the time interval. In various embodiments, each transmission of the plurality of transmissions may include sensor data collected via one or more sensors of the sensor device. In various embodiments, the data may be based at least in part on the sensor data. In various embodiments, the data may include the sensor data.

In various embodiments, the first electronic communication may correspond to a synchronization message that may include an indication of a gateway capacity. In various embodiments, the synchronization message may further include timing information that indicates a timing parameter and that causes the sensor device to align a timer with the timing information. In various embodiments, the second electronic communication may correspond to a discovery message that may include a unique identifier of the sensor device and device type of the sensor device. In various embodiments, the broadcasting the first electronic communication may include broadcasting the first electronic communication on each channel of the plurality of different channels. In various embodiments, the broadcasting the first electronic communication may further include periodically broadcasting the first electronic communication in a plurality of instances of the first time slot of the time interval. In various embodiments, the third electronic communication may correspond to a deploy message that may further include an indication of an assigned channel to use for the plurality of transmissions from the sensor device. The plurality of transmissions may be received on the assigned channel. The assigned channel may be selected from the plurality of different channels or may be different from the plurality of different channels.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Figure 1:
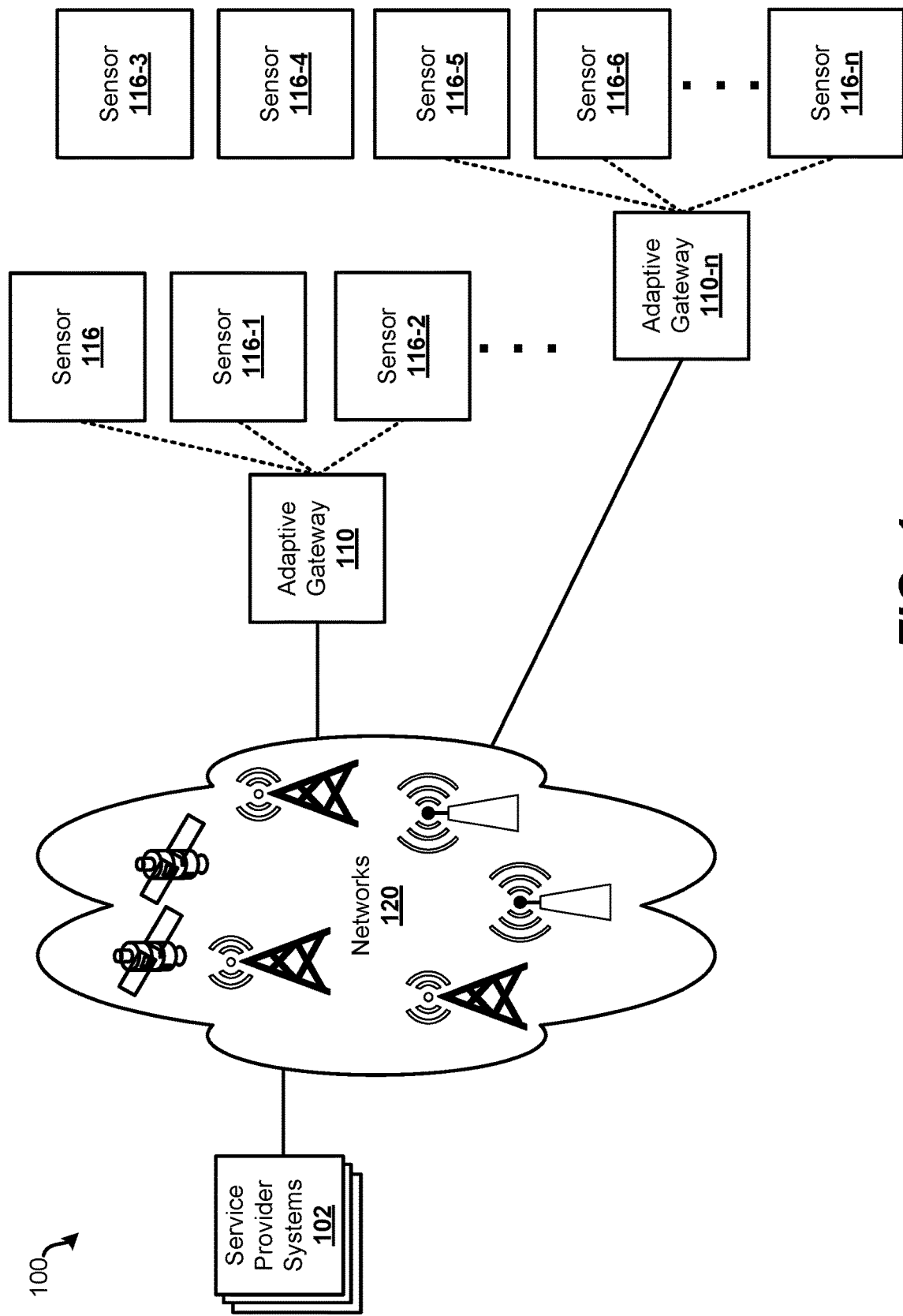
FIG. 1 illustrates an adaptive gateway system, in accordance with disclosed embodiments according to the present disclosure.

Various embodiments will now be discussed in detail with reference to the accompanying figures, beginning with FIG. 1. FIG. 1 illustrates an adaptive gateway system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific. At least some of the aspects of the system 100 may correspond to smart city applications and/or smart building applications. The system 100 may include one or more service provider systems 102, one or more adaptive gateways 110, and sensor devices 116. Many embodiments may include a large number of service provider systems 102, adaptive gateways 110, and/or sensor devices 116.

In contrast to conventional technologies, the technical improvements with disclosed embodiments may provide for and/or otherwise facilitate one or more end-to-end IoT platforms to truly realize the full potential for IoT devices in smart city applications and smart building applications, such as a widely deployed wireless network platform that allows application developers and device manufacturers the ability to seamlessly develop and deploy devices on the network with minimal effort. Disclosed embodiments may provide for the ability for an IoT device to be deployed into an environment and to be configured to detect available and proximate adaptive gateways 110 in its vicinity, connect to an adaptive gateway 110, and initiate network deployment without human intervention. Disclosed embodiments may be configured to employ an IoT network protocol. In some embodiments, the IoT network protocol may correspond to an open, light-weight, secure wireless network protocol that enables rapid development of IoT devices that can easily join the one or more networks. In particular embodiments disclosed herein, the IoT network protocol may correspond to a wireless sensor IoT protocol that may allow for seamless, quick integration with various sensor products and connection to the one or more networks. In some embodiments, the IoT network protocol may correspond to an open library that can be independent of proprietary code base. Not only may disclosed embodiments provide for improvements in deploying IoT devices onto a network, but also improvements in managing IoT devices over their lifecycles, including manufacturing modes, ship modes, deploy modes, and run modes.

Disclosed embodiments may include one or more adaptive gateways 110 configured to provide access points for local-area wireless networks to connect to one or more other networks 120, which may include the Internet. For example, as illustrated, embodiments may provide an IoT platform with adaptive gateways 110 to facilitate applications involving sensor devices 116. The adaptive gateway 110 may correspond to a neutral host gateway that may not be not specific to any one entity or application, but that provides multiple slots for radio modules that can manage a wireless local area network (WLAN).

Disclosed embodiments may include one or more adaptive gateways 110 and may solve a number of technical problems and deficiencies that are observed with conventional gateways, particularly in regards to deployment of IoT devices. In contrast to embodiments disclosed herein, conventional gateways fail to provide the intelligence and features necessary to facilitate adapting to various sensor devices, sensor configurations, changes in deployments of sensor devices, bandwidth requirements and changes, and other developments with smart city and smart building applications. Likewise in contrast to embodiments disclosed herein, conventional gateways often fail to adapt to different service provider systems and the corresponding needs for sensor data. With conventional gateways, IOT device deployment may require manual configuration of the conventional gateways and/or the sensor devices. Embodiments disclosed herein, however, provide for automated end-to-end deployment features. Further, conventional gateways are limited in scalability and extensibility, whereas disclosed embodiments advantageously provide scalability and extensibility while optimizing bandwidth usage.

The adaptive gateway 110 may provide more flexibility than conventional gateways and the adaptive gateway 110 can make better decisions, particularly as far as new sensor devices 116, sensor data, network technologies, and packet types. The intelligence and logic of the adaptive gateway 110 facilitates a smarter, more robust gateway for extension and transition to various sensor devices 116, sensor data, network technologies, and packet types. With disclosed embodiments, the adaptive gateway 110 may enable more optimized allocation of bandwidth depending on types of sensor devices 116, sensor data, network technologies, and packet types. In various examples, the adaptive gateways 110 may be disposed for coverage of an urban area, such as being disposed on grid of street corners, buildings, utility poles, and/or the like. Additionally or alternatively, the adaptive gateways 110 may be disposed in buildings. Thus, the adaptive gateways 110 may provide for coverage areas and coverage volumes for sensor devices 116 for one or more smart city applications and/or smart building applications, such as sensor-based parking, trash collection, gunshot detection, temperature detection, and/or the like applications where the sensor devices 116 may wirelessly communicate to an adaptive gateway 110 that bridges the local network (e.g., RF network) of the sensor devices 116 to one or more networks 120 (e.g., the Internet) and one or more service provider systems 102.

Using the wireless sensor IoT protocol, the adaptive gateway 110 may be extensible to a variety of types of sensor devices 116. Various instances of endpoint environments at various localities may include one or a combination of the various types of sensor devices 116. The sensor devices 116 may, by way of example, include one or a combination of proximity sensors, motion detectors, light sensors, cameras, infrared sensors, vibrational detectors, microphones, other audio sensors, temperature sensors, humidity sensors, barometric sensors, RFID detectors, reed switches, and/or the like configured to implement sensor IoT protocols disclosed herein. The service provider systems 102 may correspond to one or more server systems, computer systems, databases, websites, portals, any repositories of data in any suitable form, and/or the like that facilitate the one or more smart city applications and/or smart building applications. The transmissions of sensor data may transport any one or combination of asynchronous real-time media transfer of video content (including audiovisual), audio, raw data, unstructured data, structured data, information, metadata, and/or other content which may include media content, text, documents, files, instructions, code, executable files, images, and/or any other suitable content suitable for embodiments of the present disclosure.

In general, the system 100 may include a plurality of networks that can be used for bi-directional communication paths for data transfer between components of system 100. The plurality of networks may include the wireless local area networks by which the sensor devices 116 and the adaptive gateways 110 communicate, as well as the one or more networks 120 to which the adaptive gateways 110 bridge the sensor devices 116. One or more networks of the plurality of networks may be or include one or more next-generation networks (e.g., 5G wireless networks and beyond). Further, the plurality of networks may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks may be implemented with, without limitation, satellite communication with a plurality of orbiting (e.g., geosynchronous) satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or message in accordance with embodiments disclosed herein. In various embodiments, the networks and its various components may be implemented using hardware, software, and communications media such wires, optical fibers, microwaves, radio waves, and other electromagnetic and/or optical carriers; and/or any combination of the foregoing and/or the like. In some embodiments, the networks may include a telephone network that may be circuit switched, package switched, or partially circuit switched and partially package switched. For example, the telephone network may partially use the Internet to carry phone calls (e.g., through VoIP). In various instances, the networks may transmit data using any suitable communication protocol(s), such as TCP/IP (Transmission Control Protocol/Internet protocol), SNA (systems network architecture), IPX (Internet packet exchange), UDP, AppleTalk, and/or the like.

Figure 2:
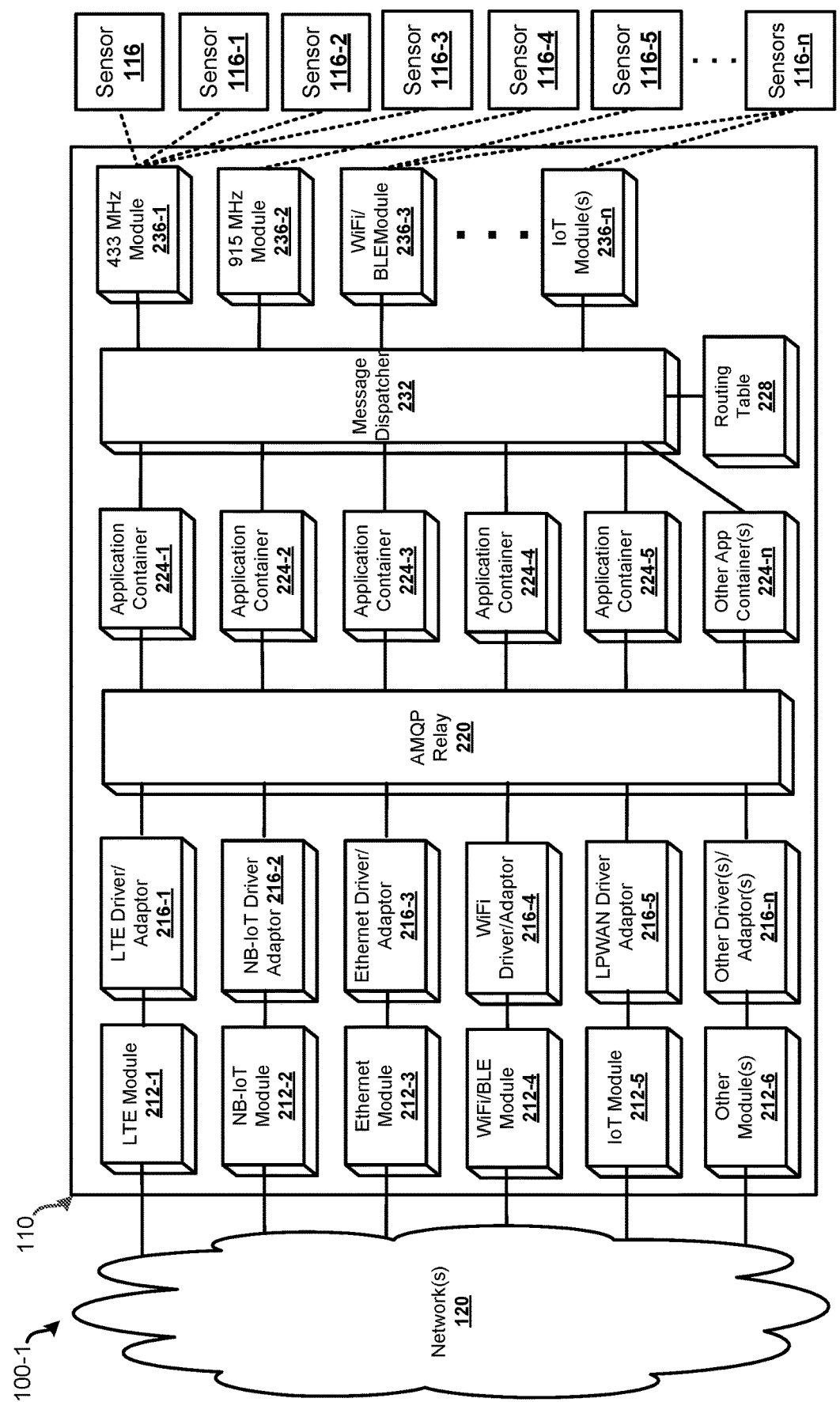
FIG. 2 illustrates certain aspects of the adaptive gateway system, in accordance with disclosed embodiments according to the present disclosure.

FIG. 2 illustrates certain aspects of the adaptive gateway system 100-1, in accordance with embodiments of the present disclosure. As illustrated in FIGS. 1 and 2, the adaptive gateway 110 may be a separate media device that is distinct from, and communicating with, one or more IoT devices according to the IoT network protocol. For example, the adaptive gateway 110 may communicate with one or more sensor devices 116 within range of the adaptive gateway 110 wireless communications links. In various embodiments, the adaptive gateway 110 may facilitate communication of the one or more sensor devices 116 via the networks 120, and may also facilitate communication of multiple sensor devices 116 with each other by forming, for example, a LAN, a WAN, a HAN, a WLAN, and/or the like at various localities.

In some embodiments, the adaptive gateway 110 may include a Layer 3 network gateway device. In some embodiments, the adaptive gateway 110 may provide a bridge from one or more sensor devices 116 to a 5G wireless network of the networks 120. The adaptive gateway 110 may include any suitable routers, switches, modems, wireless transceivers, wired ports, etc., one or more processors, and input-output (I/O) interfaces, and one or more types of memory, with an operating system and instructions stored in non-transitory memory such that the adaptive gateway 110 may be configured to function as a special-purpose computer to provide the intelligent sensor control features in accordance with various embodiments disclosed herein. The adaptive gateway 110 may differentiate and indicate different types of traffic, and intelligently route traffic suitable for a next-generation network (e.g., 5G wireless network and beyond), as well as other traffic.

The adaptive gateway 110 may be configured to employ the IoT network protocol and communicate with a plurality of sensor devices 116, identify received transmissions from the sensor devices 116 in particular types of protocols, and then route the different types of packets differently, with prioritization and different network slicing based at least in part on one or a combination of types of sensor devices 116, sensor data, network technologies, and/or packet types. In various embodiments, the adaptive gateway 110 may be configured to receive a multiplicity of transmissions according to a multiplicity of communications protocols that may corresponding to one or a combination of any suitable radio frequency communications (e.g., 433 MHz, 915 MHz, etc.), WiFi, Bluetooth (BLE), LTE, 5G, 4G, communications per the NBIOT standard, next-generation wireless networks such as video per the ATSC 3.0 standard, and/or the like. In various embodiments, the adaptive gateway 110 may be configured with a variety of different modules 212, 236 to manage a variety of different networks of sensor devices 116 and/or may self-configure by downloading different modules 212, 236 and/or applications 234 responsive to detecting a particular sensor device 116 and determining the corresponding sensor type and module 212, 236 and/or application 234 needed for communication with the particular sensor device 116. Accordingly, the adaptive gateway 110 may be configured to include communication interface modules 236. The communication interface modules 236 may correspond to IoT modules that may, for example, include radio modules that plug into slots within the adaptive gateway 110 and host a local-area-network (LAN) over an RF interface. For example, the communication interface modules 236 may include a 433 MHz module 236-1, a 915 MHz module 236-2, a WiFi/BLE module 236-3, and/or the like modules (WiFi, LTE, 5G, 4G, NBIOT, various low-power wide-area network modules, etc.) corresponding to one or more of the multiplicity of communications protocols. The adaptive gateway 110 may include one or more relays 220, drivers/adaptors 216, and modules 212 that facilitate transfer of data from applications 224 up to the cloud and vice versa. The drivers/adaptors 216 may include the software necessary to operate the different interfaces and corresponding modules 212 specifically configured for the particular network connections (e.g., LTE, 5G, 4G, NBIOT, Ethernet, WiFi, LPWAN, and/or the like).

The communications interfaces corresponding to the communication interface modules 236 and/or 212 may, for example, be capable of transmitting and receiving information wirelessly through both short range, radio frequency (RF), cellular, Wi-Fi, and/or the like connections. The communications interfaces may, for example, provide a near field communication interface (e.g., Bluetooth, optical interface, infrared interface, etc.) and/or wireless communications interfaces capable of communicating through a cellular network, Wi-Fi, and/or the like. In various embodiments, the communications interfaces may correspond to a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like in the adaptive gateway 110. The communication interface(s) corresponding to the communication interface module(s) 236 and/or 212 may include at least one antenna for wireless data transfer according to the communications protocol(s). For example, the antenna may include a cellular antenna (e.g., for sending and receiving cellular data communication, such as through a network such as a 3G, 4G, or 5G network).

The adaptive gateway 110 may include a message dispatcher 232 configured to manage traffic to and from the different sensor devices 116. The message dispatcher 232 and the modules 236 may be communicatively connected by way of one or more serial communication links. The message dispatcher 232 may, for example, manage communications between the modules 236 and applications 224. The different applications 224 that reside on the adaptive gateway 110 may consume data generated by corresponding sensor devices 116. The message dispatcher 232 may interconnect the various applications 224 to the various modules 236. While in some embodiments the various components (e.g., modules 212, modules 236, drivers and adaptors 216, relay 220, applications 224, message dispatcher 232, etc.) may be separate and distinct as illustrated, one or more of the components may be integrated in various embodiments. The message dispatcher 232 may maintain a routing table 228 in storage that retains mappings of the applications 224 to the modules 236. One or more of the applications 224 on the adaptive gateway 110 and/or applications up in the cloud may need to communicate with a particular module 236 and may be consumers of the information generated by that module 236. The message dispatcher 232 may use the routing table 228 to direct traffic.

Over the lifecycle of the adaptive gateway 110, the routing table 228 may be populated as devices are plugged in. For example, when a module 236 is plugged in and the adaptive gateway 110 is powered up, the adaptive gateway 110 may discover the module 236 and may create one or more entries in the routing table 228. When a website and/or portal is exposed to endpoints to bring sensor devices 116 onto the network 120, the adaptive gateway 110 may add identification, specification, and authorization information for those sensor devices 116 to the routing table 228 so the message dispatcher 232 may subsequently understand that a particular application 224 is authorized to communicate with a sensor device 116 connected to a particular module 236 and the routing table 228 may provide the routing for the communications. For example, after an entry is added in the routing table 228 to define a route from a particular sensor device 116 and/or module 236 to a particular application 224 (and vice versa), the message dispatcher 232 may use the routing table 228 to identify a received message target. In various embodiments, the sender may provide its ID with or without a target ID, and the message dispatcher 232 may verify the authenticated routed and then transfer the message. For example, when a sensor device 116 sends data to a module 236 and the module 236 reports that data, the message dispatcher 232 uses the routing table 228 to determine which applications 224 are supposed to consume that data and routes the data to the appropriate applications 224.

In various embodiments, the routing information may include unique ID information that may correspond to ID data structures of 64-bits or any suitable size, with a portion (e.g., 32 bits) of the ID corresponding to an ID that is controlled by a service provider system 102 (e.g., that manages a database of IDs for other service provider systems and other users of the adaptive gateway 110 and/or the IoT protocol). The service provider system 102 may provide a website and/or portal for endpoints to register sensor devices 116. The registration may include specifying one or more destination computer systems (e.g., server systems, computer systems, databases, websites, portals, any repositories of data in any suitable form, and/or the like) to which an adaptive gateway 110 may transmit communications, sensor data in raw form, processed form, aggregated data, and/or consolidated as specified by the endpoints (e.g., the gateway may accordingly store sensor data, remove redundant data, average data over a period of time, etc., to derive further sensor-based data to transmit to remote systems periodically, on-demand, when a change in sensor data state/pattern is detected by the gateway, and/or the like), and/or other data from and/or regarding the registered sensor devices 116 via the one or more networks 120. In addition or in alternative, such specifications may be provided by the applications 224. In various embodiments, an application 224 may be configured with such specifications initially when the application 224 is initially installed on the adaptive gateway 110 and/or at a later time after the application 224 is initially installed. In some embodiments, an authenticated endpoint may be allowed to communicate with and update the application 224 after it is installed, and, in such embodiments, the endpoint may be allowed to set and/or update such specifications. In addition or in alternative to such transmissions to the one or more destination computer systems, the adaptive gateway 110 may be configured to send such transmissions to the service provider systems 102. In some embodiments, the service provider systems 102 may include the one or more destination computer systems.

Consequent to registration, the ID (e.g., a numeric or alphanumeric identifier that may be included the first 32-bit portion of the ID data structure) may be assigned to a particular sensor device 116 that identifies the sensor device 116 and an entity associated with the sensor device 116. Another portion of the ID data structure (e.g., the last 32 bits) may be a unique ID that the entity may assign. Accordingly, a unique ID may be mappable to each sensor device 116 and may be retained in the routing table 228. In like manner, IDs data structured may also be created for applications 224 and for modules 236 and/or 212 with unique IDs issued to each of the applications 224 in the application containers and each of the modules 236 and/or 212.

The application layer communications of the adaptive gateway 110 may support a command/response protocol, where commands are messages that instruct a device or application to take some action, and responses are messages that return the result of the command message. These messages may begin with a command byte and may be followed by one or more bytes of data. The messages may be transported in the payload of a TLV encoded packet. The packet may also include a message type identifier to aide in routing and parsing. An application residing either in the cloud and/or an application 224 on the gateway 110 may exchange messages with a sensor device 116 via point-to-point communications and/or multicast communications.

The adaptive gateways 110 may be assigned a specific channel when coming onto the network 120. When a deployed gateway 110 is powered on, it may listen for RF noise or other gateways' SYNC (synchronization) messages on all channels and selects a deploy channel and a run channel that is not already taken and has the lowest RF noise. When the adaptive gateway 110 detects the SYNC message of another gateway 110, the detecting gateway 110 may query the service provider system 102 for the other gateway's Run channel, and then listens for RF noise on other channels before selecting its own Run channel.

Various embodiments may provide for various numbers of channels and channel ranges. For example, numbers of channels may be defined to be: 39 channels, 50 kHz wide, for 433 MHz sensor devices 116; 79 channels, 25 kHz wide, for 433 MHz sensor devices 116; 130 channels, 200 kHz wide, for 915 MHz sensor devices 116; and/or the like. Channels 0 and 1 may be reserved for Ship mode communications. An adaptive gateway 110 may transmit Wake from Ship messages on channel 0, and sensor devices 116 may respond on channel 1.

With employing the IoT network protocol, adaptive gateways 110 and sensor devices 116 may be configured to have a common knowledge of dedicated timeslot allocation for sync messages, discovery messages, deploy messages, and multi-cast messages. The time slot allocation features of the adaptive gateway 110 may include creating a slot cycle of 1 minute (or another suitable duration) so that the slot numbers will repeat every minute. In some embodiments, the adaptive gateway 110 may define 240 slots per minute, each slot being 250 milliseconds long. Other embodiments may employ other slot divisions. In some embodiments, the adaptive gateway 110 and the sensor device 116 may use a low power counting mode (e.g., based on the LFCLK, 32.768 kHz) to generate precise time slots for RF communications. The counter tick timing may be configurable, but all devices may be accurate when tick timing is a power of 2.

In some embodiments, the first time slot (i.e., time slot 0) may be designated as a SYNC time slot. Once a minute, each adaptive gateway 110 may send a brief message in time slot zero. The message may be a periodic SYNC message that contains a small amount of information about the adaptive gateway 110. This SYNC message may allow sensor devices 116 to discover the adaptive gateway 110 and to align their timers with the adaptive gateway 110 based on timing information sent in the SYNC message. In various embodiments, the timing information may include specifications of one or more values of one or more timing parameters of the adaptive gateway 110 timing mechanism. In various embodiments, the timing mechanism may correspond to a clock and/or a counter, and the timing information may include one or a combination of one or more time slots, one or more timestamps, one or more time boundaries, one or more time offsets/durations, and/or the like to indicate the timing mechanism of the adaptive gateway 110 and to allow the sensor devices 116 to align their own slot counters with that of the adaptive gateway 110. In some embodiments, all SYNC messages may be sent during time slot 0 on one of five preassigned channels. The sensor device 116 may listen for one full minute on each of the 5 dedicated deploy channels to catch the SYNC message from all gateways 110 in range. In some embodiments, Discovery messages may be assigned to time slot 1, Deploy messages may be assigned to time slot 2, Multicast messages may be assigned to time slot 3, and remaining time slots may be assigned to sensor devices 116 as they come online. Other embodiments are possible.

In some embodiments, each module 236 may maintain a whitelist with assigned slot numbers and unique IDs of the sensor devices 116 with which the module 236 communicates. Every time the sensor device 116 communicates, the module 236 may use the whitelist to authenticate the communication. The module 236 may determine whether it recognizes the sensor device 116 sending the communication and whether the sensor device 116 is communicating within in correct time slot to which the sensor device 116 is assigned. Once the communication is authenticated, the module 236 may pass the communication, by way of the message dispatcher 232, to the application 224 that is to consume the data from the sensor device 116. In alternative embodiments, the message dispatcher 232 may maintain a whitelist (e.g., in the routing table 228) for all the sensor devices 116 and may perform the communication authentications.

Figure 3:
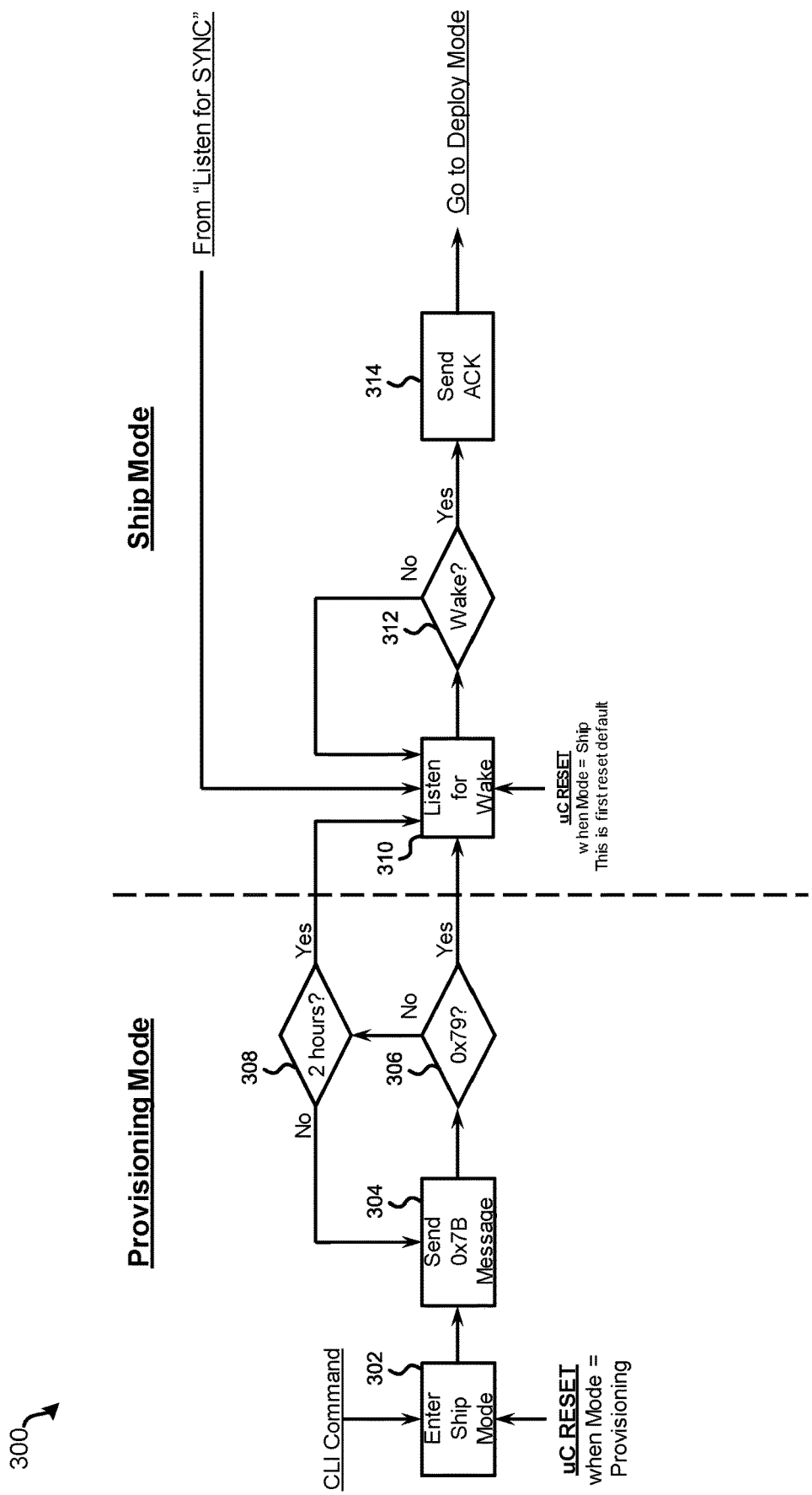
FIG. 3 illustrates a flow diagram of a method for employing IoT network protocol with provisioning IoT devices and transitioning the IoT devices to deployment, in accordance with disclosed embodiments according to the present disclosure.

FIG. 3 illustrates a flow diagram of a method 300 for employing IoT network protocol with provisioning IoT devices and transitioning the IoT devices to deployment, in accordance with embodiments of the present disclosure. In the example of method 300, certain aspects of a provisioning mode and a ship mode of the IoT network protocol are depicted. The method 300 and the other methods disclosed herein may be performed by the adaptive gateway 110 and the sensor device 116. Provisioning mode may correspond to an initialization mode for the sensor device 116, say, in a manufacturing stage, at a factory, at later reset stage, etc. Ship mode may correspond to the sensor device 116 being in transit or in storage. However, other embodiments may include other types of IoT devices employing the method 300 and the other methods disclosed herein in addition to, or in alternative to, the sensor device 116.

Conventionally, IoT device deployment may require manual recording of all IDs of the device into a database, manually assigning a device to a gateway that was deployed in the field, and manually deploying the device onto a network. Advantageously, disclosed embodiments avoid such cumbersome and slow activities, while providing scalability and extensibility. For example, disclosed embodiments may be extensible to various entities, various devices, various numbers of device, and various locations for deployment. An entity in Los Angeles, with a warehouse in Phoenix, may want to deploy a device in Denver. With disclosed embodiments, the IoT network protocol may be employed by the device and one or more adaptive gateways 110 so that, once the device may be initialized in provisioning mode, the device may be transitioning to ship mode with shipping to Denver, and then transitioned to deploy mode when the device is positioned in Denver.

As indicated by block 302, the sensor device 116 may enter ship mode upon initialization, for example, consequent to an initialization command. The sensor device 116 may accordingly reset to a provisioning mode. To conserve power storage, various embodiments may provide for the sensor device 116 to enter, maintain, and, after waking, revert to one or more low-power states.

As indicated by blocks 304, 306, and 308, the sensor device 116 may transmit request to exit ship mode commands, 0x7B, once a minute for first 10 minutes, then once every 5 minutes for 2 hours. In response, an adaptive gateway 110 (e.g., in a production environment) may transmit an enter ship mode command, 0x79, to put transition the sensor device 116 into ship mode. If no such command is received after 2 hours, then the sensor device 116 may automatically transition to ship mode. Other embodiments may employ other request frequencies, time limits, and defaults.

The sensor device 116 may be configured to enter an ultra-low-power sleep state (e.g., approximately 0.058 uA or less) to conserve battery power. Thus, as indicated by block 310, in transitioning to ship mode, the sensor device 116 may enter the ultra-low-power listening state. In some embodiments, the sensor device 116 may broadcast a message periodically to indicate that it is in ship mode. As indicated by blocks 310 and 312, once a day (or other suitable time period), the sensor device 116 may be configured to wake up and listen for a wake from ship message from an adaptive gateway 110 (e.g., that may be located in a distribution center or deployment truck). The adaptive gateway 110 may, for example, transmit a wake from ship command on channel 0. As indicated by block 314, once the command message is received, the sensor device 116 may be configured to transmit an acknowledgment (e.g., on channel 1) and transition into deploy mode. The message may pass configuration parameters to the sensor device 116 for how the sensor device 116 should operate. The sensor acknowledgement may be started at any suitable time (e.g., between 0 and 30 minutes) from receiving the wake command and may be sent in burst mode to ensure the acknowledgment is received when other sensor devices 116 are trying to acknowledge at the same time.

Figure 4:
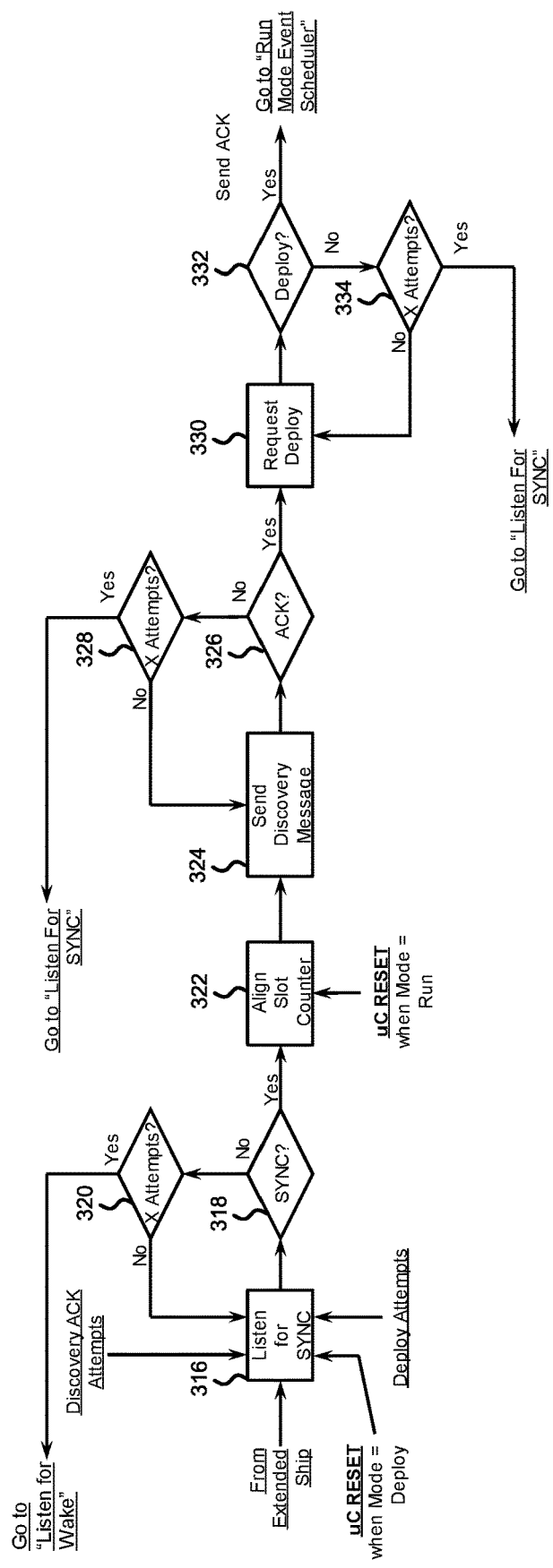
FIG. 4 illustrates a continuation of the flow diagram of the method for employing IoT network protocol with deploying IoT devices, in accordance with disclosed embodiments according to the present disclosure.

FIG. 4 illustrates a continuation of the flow diagram of the method 300 for employing IoT network protocol with deploying IoT devices, in accordance with embodiments of the present disclosure. In the example depicted, certain aspects of a deploy mode of the IoT network protocol are depicted. As indicated by blocks 316, 318, and 320, the sensor device 116 has come out of ship mode and searches its environment to detect available gateways 110 to which it may connect.

Sensor devices 116 may be configured (e.g., during ship mode) to listen on one or more channels for adaptive gateway 110 SYNC and multicast messages. In so doing, the sensor devices 116 may maintain an ultra-low-power listening mode (e.g., 0.290 uA or less) to conserve power while listening for messages from the adaptive gateway 110. Sensor devices 116 may try to join the network by trying to find one or more SYNC messages from one or more adaptive gateways 110 that might be within range of the sensor devices 116. The sensor devices 116 may listen on multiple channels to see how many gateways 110 are within range. For example, a sensor device 116 may periodically listen for adaptive gateway 110 SYNC messages periodically transmitted by one or more gateways 110 on 5 different channels until it has detected all adaptive gateways 110 within range. The sensor device 116 may be configured to listen at intervals (e.g., 1-minute intervals or another interval) as configured in the wake from ship command. A number of attempts to be made before going back to ship mode may be also be configured in the wake from ship command. When the sensor device 116 has detected all adaptive gateways 110 within range, it may then make a decision regarding which adaptive gateway 110 to deploy to based on RF signal quality and the number of available time slots on the adaptive gateway 110 (e.g., which may be indicated in the SYNC message). For example, a sensor device 116 may determine which adaptive gateway 110 has the strongest RF signal and/or the most capacity (e.g., which has the most available time slots to be inserted into). Such determination may include scoring each adaptive gateway 110 detected and ranking the gateways 110 based on the scores. Then the sensor device 116 may select the highest scoring gateway 110 (e.g., based on a cumulative score that takes into account scoring of signal strength and scoring of time slot availability) and initiate connection to, and deployment onto the network via, the selected gateway 110.

As indicated by block 322, once an adaptive gateway 110 has been selected, the sensor device 116 may align its own timing mechanism (e.g., slot counter/timer) with the timing specifications provided by the selected adaptive gateway 110 with the SYNC message it sends once a minute. As indicated by block 324, the sensor device 116 may send a Discovery message in the Discovery time slot (e.g., time slot 1) to the selected gateway 110. The discovery message may identify the sensor device UID and device type. As indicated by blocks 326 and 328, the sensor device 116 may begin listening (e.g., once a minute) for acknowledgement from the adaptive gateway 110. At various stages of embodiments disclosed herein, once a failure is detected, the protocol may provide for regressing to a previous state so the sensor device 116 may recovery itself. For example, as indicated by blocks 324, 326, and 328, attempts for a discovery acknowledgement may be made before the process flow reverts to listening for SYNC. The maximum number of attempts may be configured in the wake from ship command.

The adaptive gateway 110 may report the discovered sensor device 116 to the service provider system 102 configured to function as the device manager, and await authorization. For example, to acquire authorization for the sensor device 116, the gateway 110 may forward the discovery message, which the message dispatcher 232 will route, to the service provider system 102 to perform device authorization verification. The service provider system 102 may check its database and determine whether the sensor device 116 is a properly registered device. Upon verification, the service provider system 102 may transmit indicia of the verification of the sensor device 116 to the gateway 110.

As indicated by blocks 330, 332, and 334, the sensor device 116 may transmit a request for deployment instructions from the selected gateway 110 in the Deploy timeslot (e.g., time slot 2). In some embodiments, once authorization is received from the service provider system 102, the adaptive gateway 110 may automatically send deployment instructions without awaiting a request. The deploy message may come after system 102 has authorized the sensor device 116 and has deployed one or more relevant applications 224 to the adaptive gateway 110 to cause installation of the one or more applications 224 on the adaptive gateway 110.

With the deployment instructions, the adaptive gateway 110 may assign a time slot to the sensor device 116. For example, the gateway 110 may transmit a deploy message (e.g., via time slot 2), which will indicate to the sensor device 116 which time slot to use and which RF channel to use. From that time forward, the sensor device 116 may use the time slot (e.g., time slot 26) to communicate, and the sensor device 116 may move into Run mode. Thus, when a sensor device 116 joins the network 120, the adaptive gateway 110 to which the sensor device 116 is connected may assign an available time window to the sensor device 116 within which time window the sensor device 116 is allowed to communicate with the adaptive gateway 110 without interference from other sensor devices 116, such that only during that time window is the sensor device 116 allowed to communicate. Other time slots may be assigned to other sensor devices 116 to, among other things, facilitate device tracking and to eliminate talk-over. In some embodiments, the sensor device 116 may determine how often it will communicate within that time slot and may specify that frequency (e.g., every 2 minutes, every 4 hours, once a day, etc.) to the adaptive gateway 110. In some embodiments, the adaptive gateway 110 may direct multiple sensor devices 116 to use the same time slot when the gateway 110 determines that the specified communication frequencies and schedules of the sensor devices 116 do not overlap.

In some embodiments, the adaptive gateway 110 may assign available time slots in a manner that maximizes temporal distance between time slots assigned to sensor devices 116. For example, if the adaptive gateway 110 has 237 available time slots, the next time slot assigned to a sensor device 116 may be at or near the middle of the available time slots (e.g., time slot 118 or 119). After that, the next time assigned to a sensor device 116 may be at or near the middle of the then remaining available time slots (e.g., time slot 59, 178, or the like). In such manner, the risk of cross-talk of sensor devices 118 over adjacent or nearby time slots (e.g., due to clock drift before clocks are realigned) is minimized. Other embodiments may employ other assignment schemes (e.g., sequentially assigning every other time slot out of the available time slots, every third time slot, etc.).

Figure 5:
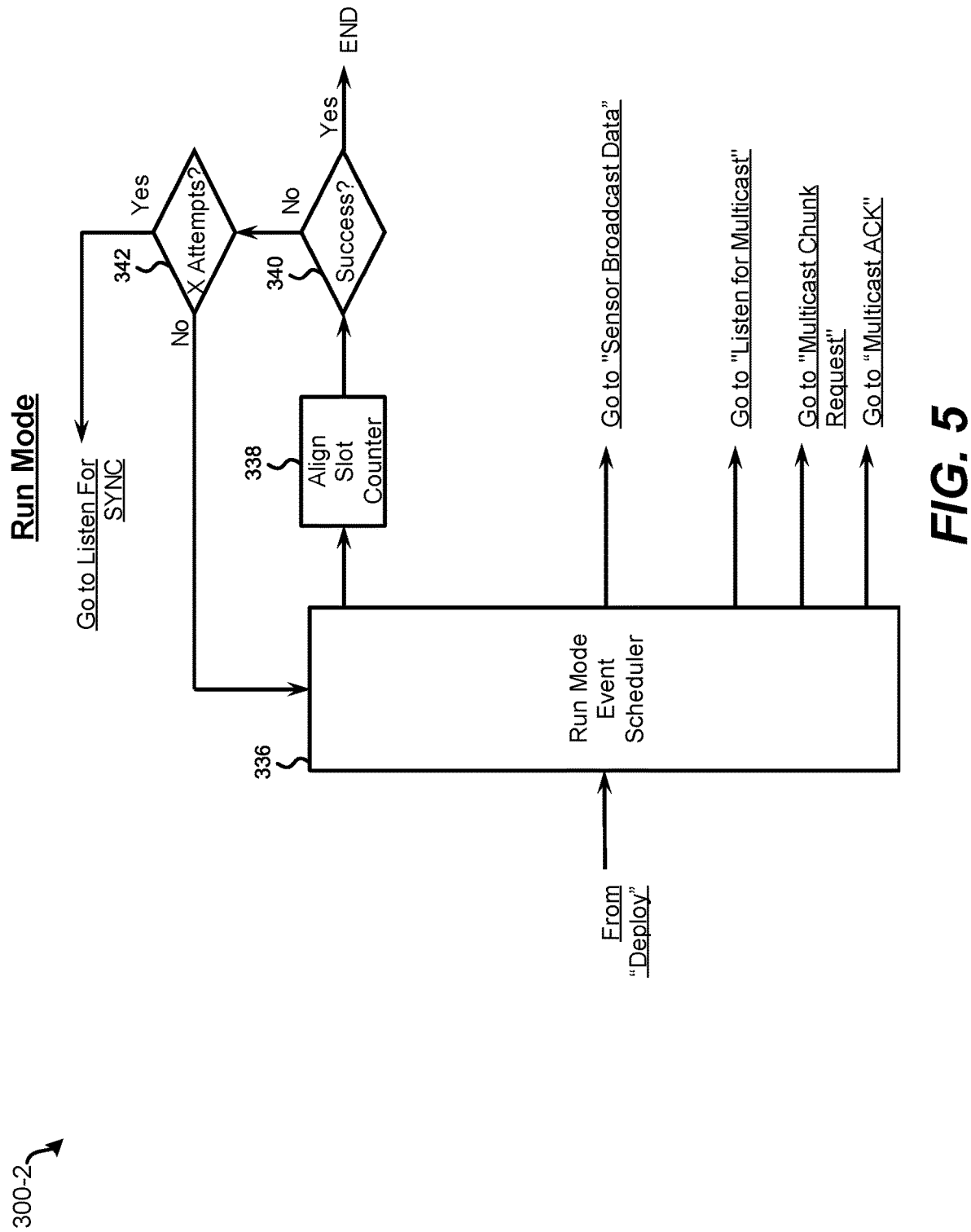
FIG. 5 illustrates a continuation of the flow diagram of the method for employing the IoT network protocol with a run mode for IoT devices, in accordance with disclosed embodiments according to the present disclosure.

FIG. 5 illustrates a continuation of the flow diagram of the method 300 for employing the IoT network protocol with a run mode for IoT devices, in accordance with embodiments of the present disclosure. In run mode, the sensor device 116 may be configured to execute event scheduler operations, as indicated by block 336. As such, run mode may provide for different events that can be scheduled, e.g., SYNC, multicast, and broadcast events.

With SYNC, as indicated by blocks 338, 340, and 342, the sensor device 116 may periodically check alignment of its slot counter. The time interval between scheduled SYNCS may be configured in the wake from ship command. Clocks can drift between an adaptive gateway 110 and a sensor device 116 with temperature, humidity, variances in crystals of timers, and/or other factors. To address that problem, the IoT network protocol may provide for a subprocess to dynamically schedule SYNC events based on temperature rate changes and/or similar metrics. The adaptive gateway 110 and sensor device 116 may ensure that sensor device 116 does not drift from assigned time slots, but rather abide by its respectively assigned time slot. To ensure drift is minimized or eliminated, the adaptive gateway 110 may use SYNC messages so that all sensor devices 116 connecting to that gateway 110 can stay aligned and ensure that they are communicating within the correct time slots. For example, the adaptive gateway 110 may periodically transmit SYNC messages (e.g., on a 1-minute cadence) to the sensor devices 116 to cause the sensor devices 116 to resynchronize their clocks to align with the sync messages. Accordingly, the sensor device 116 may realign its slot counter to stay synced up.

Figure 6:
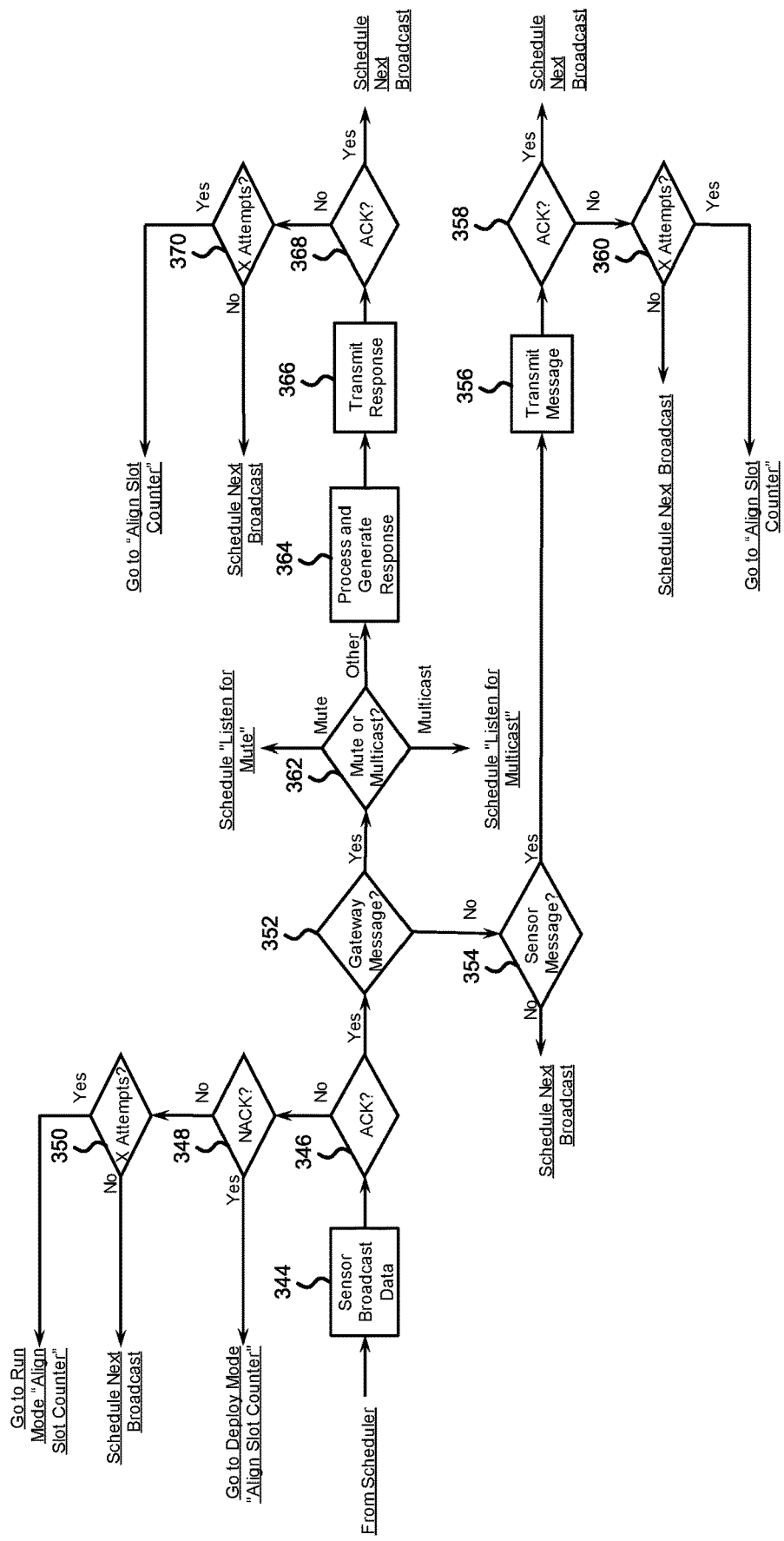
FIG. 6 illustrates a continuation of the flow diagram of the method for employing the IoT network protocol with a broadcast mode for IoT devices, in accordance with disclosed embodiments according to the present disclosure.

FIG. 6 illustrates a continuation of the flow diagram of the method 300 for employing the IoT network protocol with a broadcast mode for IoT devices, in accordance with embodiments of the present disclosure. With broadcast mode, the sensor device 116 may broadcast data and exchange messages with the adaptive gateway 110. The time interval between scheduled broadcasts may be configured in the wake from ship command. Sensor devices 116 may not be normally active until their assigned broadcast time slot and their defined broadcast time interval which can be anywhere from one or more times every minute to once every 24 hours or more. Messages may be queued by the adaptive gateway 110 and the sensor device 116 for delivery until the next scheduled data broadcast event. The adaptive gateway 110 and the sensor device 116 both may have message queues where these messages can be saved until the broadcast event. When sensor devices 116 report their sensor data (e.g., temperature data, humidity data, or other information and/or data generated by the sensor device 116). For the reporting of sensor data, the sensor devices 116 may use their UID as the source ID along with a destination ID. Business rules may be put in place on the adaptive gateway 110 that allow various applications 224 to subscribe to the broadcast, and the message dispatcher may determine the route for each of the subscribed applications 224.

As indicated by blocks 344, and 346, consequent to a sensor broadcast, the sensor device 116 may wait for an acknowledgement from the adaptive gateway 110. As indicated by block 348, in the case that a negative acknowledgement is received, indicating that timing of the communication is misaligned, the flow may transition to aligning the slot counter. As indicated by block 350, if no negative acknowledgement is received, the sensor device 116 may either schedule the next broadcast or transition to aligning the slot counter if a threshold number of attempts is made without receiving an acknowledgment.

Once an acknowledgement is received, the flow may provide for receiving a message from the adaptive gateway 110, as indicated by block 352. With a point-to-point communication method, an application 224 may address a specific sensor device 116 by its UID, and vice versa. As illustrated, messages of this type may be exchanged during sensor data broadcast events. If the adaptive gateway 110 is holding a message for the sensor device 116, then that message may be transmitted after the sensor data is received, and the sensor device 116 may process and generate a response in the current RF session, as indicated by blocks 362, 364, 366, 368, and 370.

However, if no gateway message is received, the sensor device 116 may have the option to transmit its own message to the adaptive gateway 110, as indicated by blocks 354, 356, 358, and 360. Thus, as illustrated by the process flow, if the sensor device 116 has a message to send, it may do so if the radio module only sends an acknowledgement to the sensor data broadcast. But, if the adaptive gateway 110 sends a message or multicast notification, then the sensor device 116 may hold the message until the next broadcast event.

Figure 7:
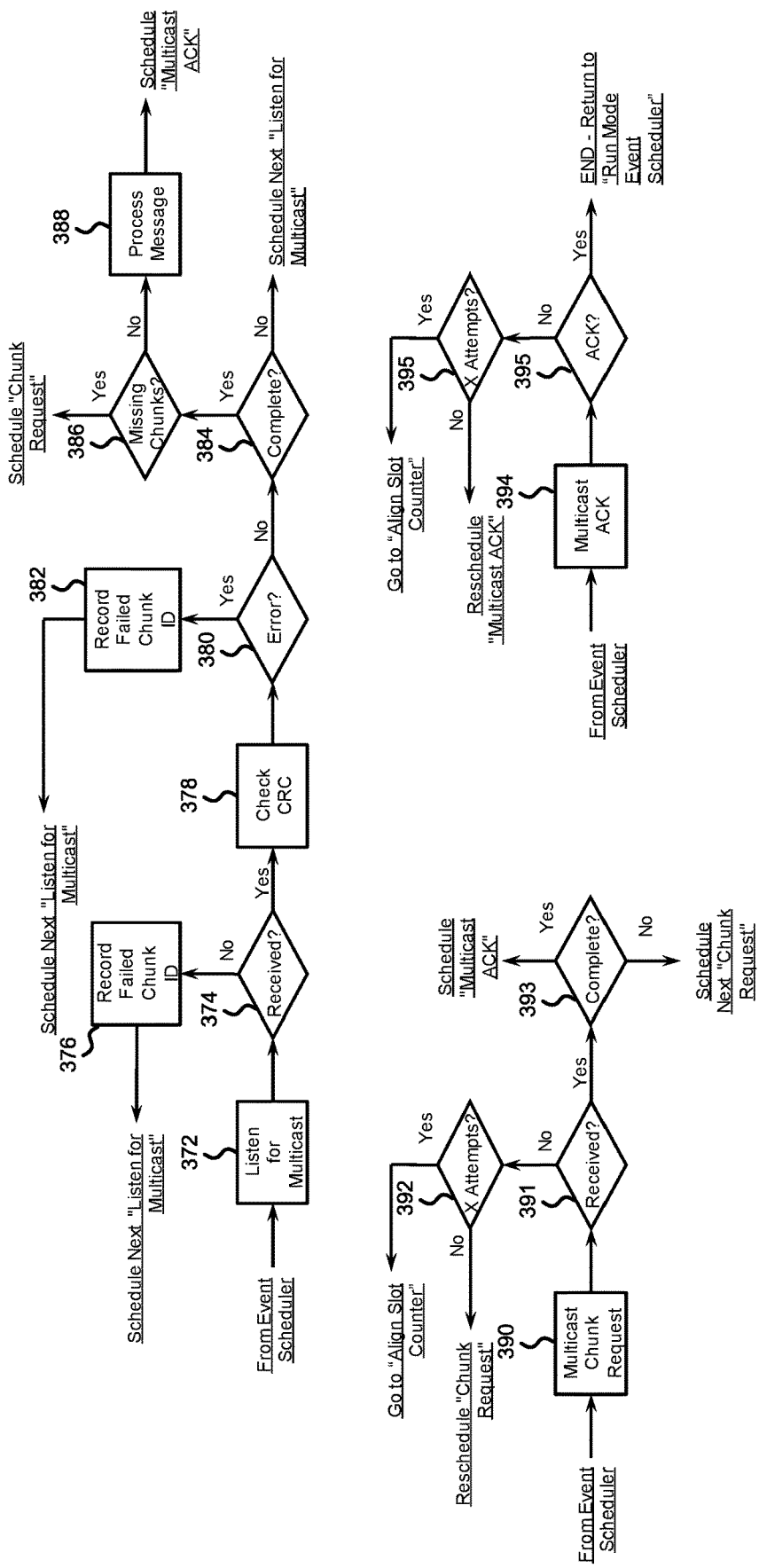
FIG. 7 illustrates a continuation of the flow diagram of the method for employing the IoT network protocol with a multicast mode for IoT devices, in accordance with disclosed embodiments according to the present disclosure.

FIG. 7 illustrates a continuation of the flow diagram of the method 300 for employing the IoT network protocol with a multicast mode for IoT devices, in accordance with embodiments of the present disclosure. With multicast mode, the adaptive gateway 110 may broadcast a message to a group of sensor devices 116. For example, an application 224 may send a message to many sensor devices 116 at once. Multicast messages may be scheduled when the adaptive gateway 110 has a message that needs to be broadcasted to a group of sensor devices 116. For example, the adaptive gateway 110 may first inform each sensor device 116 of the schedule of one or more upcoming multicast messages on the multicast time slot 3. The scheduling messages may be transmitted during broadcast event, as indicated by block 352. Then each sensor device 116 may listen for the one or more multicast message per the schedule, as indicated by block 372.

The multicast message may, for example, correspond to a firmware update, a security update, and/or the like. Firmware images, for example, can be very large relative to the maximum message size, so such messages may be sent to every sensor device 116 all at once. A new message segment may be delivered once every slot cycle (e.g., a 1-minute cycle or another suitable cycle). As indicated by blocks 372, 374, 376, 378, 380, 382, 384, 386, and 388, sensor devices 116 may listen in this time slot each cycle until the entire message has been received. Multicast messages that are too large for one transmission may be broadcast in chunks every slot cycle until the entire message is transmitted. As indicated by block 376, failed chunk transmissions may be recorded, and another multicast listening event may be scheduled (e.g., when other chunk transmissions of the multicast are completed). As indicated by block 378, the sensor devices 116 receiving multicast messages may perform a CRC check on every message and/or message chunk. In the case of one or more errors being detected pursuant to the CRC check, the failed chunk IDs may be recorded, as indicated by block 382, and another multicast listening event may be scheduled.

As indicated by block 386, in the case of one or more missing chunks being detected, one or more chunk requests may be scheduled. For example, when other chunk transmissions of the multicast are completed, the one or more missing chunks may be sequentially requested, as indicated by block 390. As indicated by block 348, in the case that a negative acknowledgement is received, indicating that timing of the communication is misaligned, the flow may transition to aligning the slot counter. As indicated by block 391, if a requested chunk is not received after a threshold number of attempts is made, the process flow may transition to aligning the slot counter. However, when a requested chunk is received, the process flow may transition to either scheduling the next chunk request or scheduling a multicast acknowledgement once all the one or more missing chunks are received, as indicated by block 393. With the multicast acknowledgement sent, the multicast subprocess may complete once an acknowledgement is received from the adaptive gateway 110, as indicated by blocks 394 and 395. However, if an acknowledgement is received from the adaptive gateway 110 after a threshold number of attempts is made, the process flow may transition to aligning the slot counter.

Figure 8:
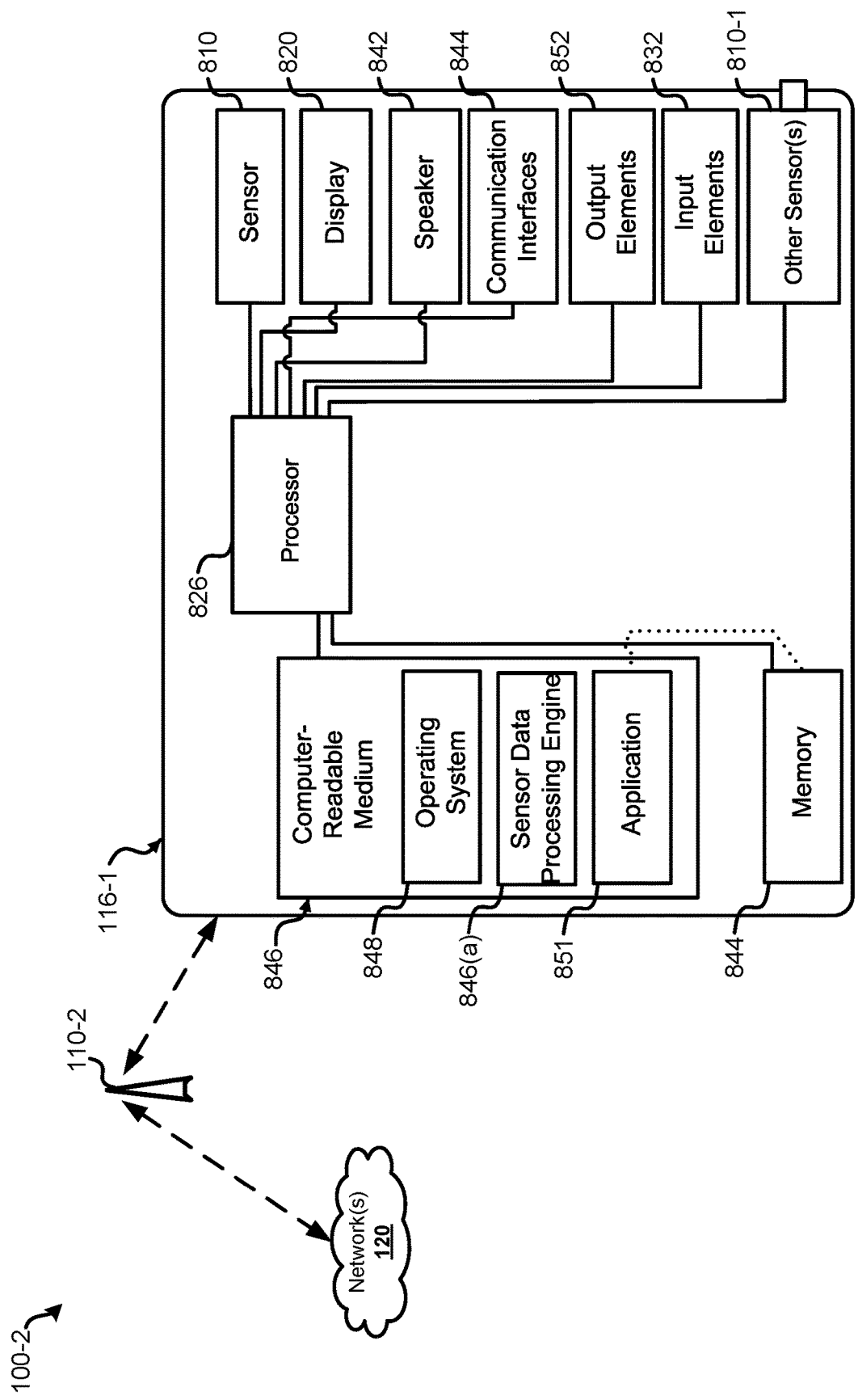
FIG. 8 illustrates certain aspects of the adaptive gateway system, in accordance with disclosed embodiments according to the present disclosure.

FIG. 8 illustrates certain aspects of the adaptive gateway system 100-2, in accordance with embodiments of the present disclosure. FIG. 8 includes a block diagram of one non-limiting example of a sensor device 116 configured to make use of and interact with an adaptive gateway 110, in accordance with disclosed embodiments of the present disclosure. The sensor device 116 may be a portable device suitable for sending and receiving information to/from the adaptive gateway 110 in accordance with embodiments described herein. In some embodiments, the sensor device 116 may be provided with an application 851 or other form of software, which may be configured to run on the sensor device 116 to facilitate various embodiments of this disclosure. For example, execution of the application 851 or other software may cause the sensor device 116 to operate in accordance with the IoT network protocol and the method 300 to facilitate features of various embodiments disclosed herein. In various embodiments, the application 851 can be any suitable computer program that can be installed and run on the sensor device 116, and, in some embodiments, the application 851 may be another type of application, set of applications, and/or other executable code configured to facilitate embodiments disclosed herein. The application 851 may be provided in any suitable way. For example, the application 851 or other code may be made available from a website, an application store, the service provider 102, etc. for download to the sensor device 116; alternatively, it may be pre-installed on the sensor device 116.

The sensor device 116 may include a memory 844 communicatively coupled to a processor 826 (e.g., a microprocessor) for processing the functions of the sensor device 116. The sensor device 116 can also include at least one computer-readable medium 846 coupled to the processor 826, which stores application programs and other computer code instructions for operating the device, such as an operating system (OS) 848. In some embodiments, the application 851 or other software may be stored in the memory 844 and/or computer-readable media 846. Again, the example of sensor device 116 is non-limiting. Other devices, such as those disclosed herein, may be used.

In various embodiments, the sensor device 116 may include a display 820 and/or other output elements 852. In some embodiments, the sensor device 116 may include input elements 832 to allow a user to input information into the sensor device 116. By way of example, the input elements 832 may include one or more of a keypad, a trackball, a touchscreen, a touchpad, a pointing device, a microphone, a voice recognition device, or any other appropriate mechanism for the user to provide input. In various embodiments, the sensor device 116 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. In some embodiments, the sensor device 116 may include a speaker 842 to provide audio output to the user.

In some embodiments, the sensor device 116 may include at least one antenna for wireless data transfer to communicate with an adaptive gateway 110 as disclosed herein. The antenna may include a cellular antenna (e.g., for sending and receiving cellular voice and data communication, such as through a network such as a 3G, 4G, or 5G network). The communications interfaces 844 can provide one or more wireless communication interfaces to facilitate communications with an adaptive gateway 110 according to one or more of the communications protocols disclosed herein, e.g., with respect to the modules 236 of the adaptive gateway 110 (e.g., 433 MHz, 915 MHz, etc.), WiFi, Bluetooth (BLE), LTE, 5G, 4G, etc.).

The sensor device 116 may include one or more sensors 810 that may, for example, include one or a combination of proximity sensors, motion detectors, light sensors, cameras, infrared sensors, vibrational detectors, microphones, other audio sensors, temperature sensors, humidity sensors, barometric sensors, RFID detectors, reed switches, and/or the like configured to implement sensor IoT protocols disclosed herein. The sensor device 116 may store sensor data in the non-transitory computer-readable storage medium 846 and/or the memory 844. In some embodiments, the computer-readable medium 846 can also include a sensor data processing engine 846(a) configured to perform processing of sensor data captured by the sensor(s) 810 to analyze, aggregate, consolidate, reformat, and/or other prepare the sensor data for transmission to an adaptive gateway 110. It will be apparent to those skilled in the art that substantial variations may be made in accordance with specific requirements. For example, customized hardware might also be used, and/or particular elements might be implemented in hardware, software (including portable software, such as applets, etc.), or both.

Figure 9:
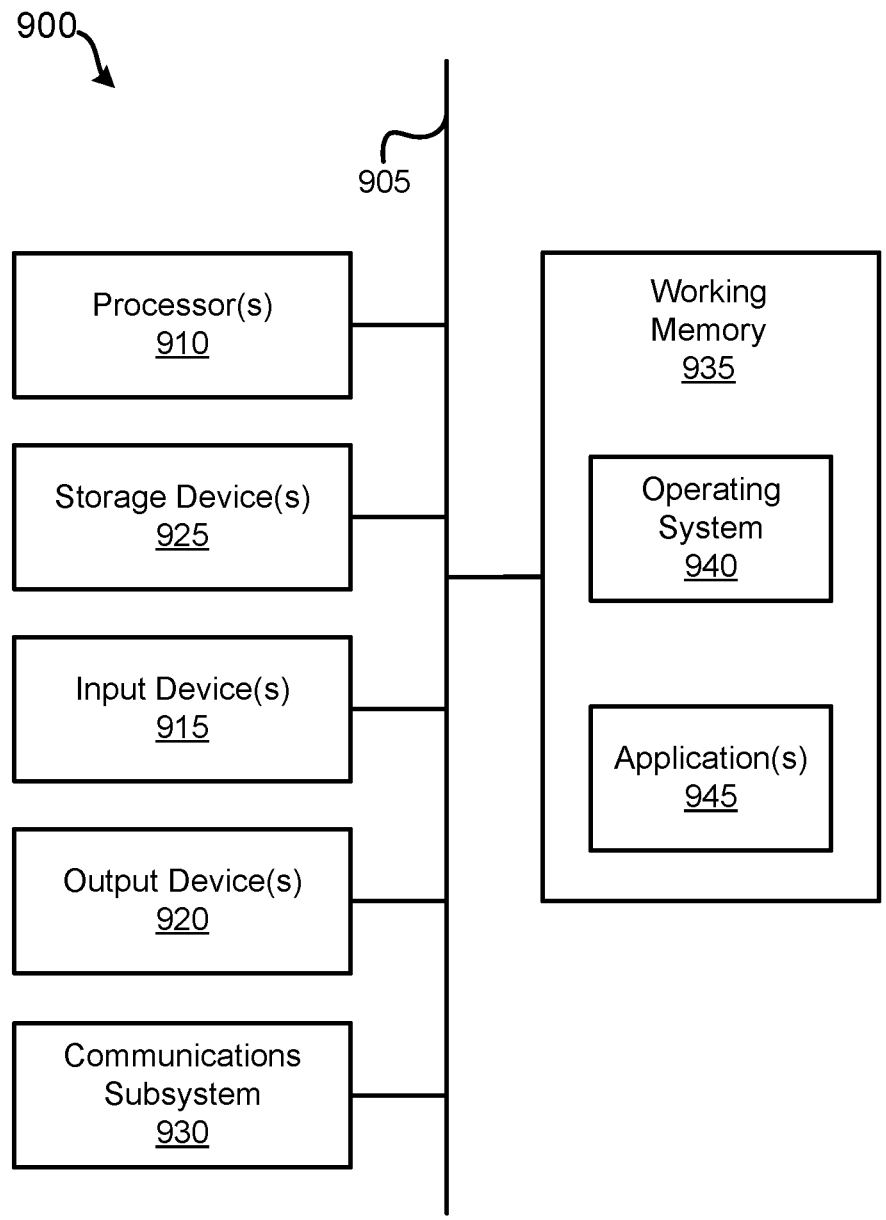
FIG. 9 illustrates aspects of a computer system that may be incorporated as part of the adaptive gateway, IoT devices, and/or service provider system, in accordance with disclosed embodiments according to the present disclosure.

FIG. 9 illustrates aspects of a computer system 900 that may be incorporated as part of the adaptive gateway 110, sensor devices 116, and/or service provider system 102, in accordance with embodiments of this disclosure. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a keyboard, remote control, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium," "computer-readable medium," and that plural forms thereof as used herein, refer to any medium or media that participate in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations.

Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to control deployment of sensor devices over wireless networks, the system comprising:
   one or more processing devices; and
   memory communicatively coupled with and readable by the one or more processing devices and having stored therein processor-readable instructions which, when executed by the one or more processing devices, cause the one or more processing devices to perform operations comprising:
   causing broadcasting of a first electronic communication on one or more channels of a plurality of different channels, where the first electronic communication is broadcasted in a first time slot of a time interval;
   processing a second electronic communication from a sensor device in response to the broadcasting of the first electronic communication, where the second electronic communication is received in a second time slot of the time interval;
   consequent to the second electronic communication:
   reporting discovery of the sensor device to a service provider system, and
   receiving an authorization of the sensor device from the service provider system;
   causing transmitting of a third electronic communication to the sensor device in response to the second electronic communication, the third electronic communication:
   transmitted in a third time slot of the time interval; and
   comprising an indication of an assignment of a fourth time slot of the time interval to the sensor device;
   processing one or more transmissions from the sensor device in one or more subsequent instances of the fourth time slot of the time interval; and
   based at least in part on the one or more transmissions from the sensor device, causing transmitting of data to one or more computer systems via one or more networks.

2. The system to control deployment of sensor devices over wireless networks as recited in claim 1, the operations further comprising facilitating a deploy mode for the sensor device at least in part by mapping an application to the sensor device, where:
   the processing the one or more transmissions from the sensor device in the one or more subsequent instances of the fourth time slot of the time interval comprises processing a plurality of transmissions from the sensor device in a plurality of subsequent instances of the fourth time slot of the time interval, and
   each transmission of the plurality of transmissions is received in a respective subsequent instance of the plurality of subsequent instances of the fourth time slot of the time interval.

3. The system to control deployment of sensor devices over wireless networks as recited in claim 2, where each transmission of the plurality of transmissions comprises sensor data collected via one or more sensors of the sensor device.

4. The system to control deployment of sensor devices over wireless networks as recited in claim 3, where the data is based at least in part on the sensor data.

5. The system to control deployment of sensor devices over wireless networks as recited in claim 4, where the data comprises the sensor data.

6. The system to control deployment of sensor devices over wireless networks as recited in claim 3, where the first electronic communication corresponds to a synchronization message that comprises an indication of a gateway capacity.

7. The system to control deployment of sensor devices over wireless networks as recited in claim 6, where the synchronization message further comprises timing information that indicates a timing parameter and that causes the sensor device to align a timer with the timing information.

8. One or more non-transitory, machine-readable media storing instructions, which, when executed by one or more processing devices, cause the one or more processing devices to perform operations comprising:
   causing broadcasting of a first electronic communication on one or more channels of a plurality of different channels, where the first electronic communication is broadcasted in a first time slot of a time interval;
   processing a second electronic communication from a sensor device in response to the broadcasting of the first electronic communication, where the second electronic communication is received in a second time slot of the time interval;
   consequent to the second electronic communication:
      reporting discovery of the sensor device to a service provider system, and
      receiving an authorization of the sensor device from the service provider system;
   causing transmitting of a third electronic communication to the sensor device in response to the second electronic communication, the third electronic communication:
      transmitted in a third time slot of the time interval; and
      comprising an indication of an assignment of a fourth time slot of the time interval to the sensor device;
   processing one or more transmissions from the sensor device in one or more subsequent instances of the fourth time slot of the time interval; and
   based at least in part on the one or more transmissions from the sensor device, causing transmitting of data to one or more computer systems via one or more networks.

9. The one or more non-transitory, machine-readable media as recited in claim 8, where the first electronic communication corresponds to a synchronization message that comprises an indication of a gateway capacity.

10. The one or more non-transitory, machine-readable media as recited in claim 9, where the synchronization message further comprises timing information that indicates a timing parameter and that causes the sensor device to align a timer with the timing information.

11. The one or more non-transitory, machine-readable media as recited in claim 10, where the second electronic communication corresponds to a discovery message that comprises a unique identifier of the sensor device and device type of the sensor device.

12. The one or more non-transitory, machine-readable media as recited in claim 11, where the broadcasting the first electronic communication comprises broadcasting the first electronic communication on each channel of the plurality of different channels.

13. The one or more non-transitory, machine-readable media as recited in claim 12, where the broadcasting the first electronic communication further comprises periodically broadcasting the first electronic communication in a plurality of instances of the first time slot of the time interval.

14. The one or more non-transitory, machine-readable media as recited in claim 13, where:
   the third electronic communication corresponds to a deploy message that further comprises an indication of an assigned channel to use for a plurality of transmissions from the sensor device;
   the plurality of transmissions are received on the assigned channel; and
   the assigned channel is selected from the plurality of different channels or is different from the plurality of different channels.

15. A method for controlling deployment of sensor devices over wireless networks, the method comprising:
   broadcasting, by a gateway device, a first electronic communication on one or more channels of a plurality of different channels, where the first electronic communication is broadcasted in a first time slot of a time interval;
   receiving, by the gateway device, a second electronic communication from a sensor device in response to the broadcasting of the first electronic communication, where the second electronic communication is received in a second time slot of the time interval;
   consequent to the second electronic communication:
      reporting discovery of the sensor device to a service provider system, and
      receiving an authorization of the sensor device from the service provider system;
   transmitting, by the gateway device, a third electronic communication to the sensor device in response to the second electronic communication, the third electronic communication:
      transmitted in a third time slot of the time interval; and
      comprising an indication of an assignment of a fourth time slot of the time interval to the sensor device;
   receiving, by the gateway device, one or more transmissions from the sensor device in one or more subsequent instances of the fourth time slot of the time interval; and
   based at least in part on the one or more transmissions from the sensor device, transmitting, by the gateway device, data to one or more computer systems via one or more networks.

16. The method for controlling deployment of sensor devices over wireless networks as recited in claim 15, where:
   the one or more transmissions from the sensor device in the one or more subsequent instances of the fourth time slot of the time interval comprises a plurality of transmissions from the sensor device in a plurality of subsequent instances of the fourth time slot of the time interval, and
   each transmission of the plurality of transmissions is received in a respective subsequent instance of the plurality of subsequent instances of the fourth time slot of the time interval.

17. The method for controlling deployment of sensor devices over wireless networks as recited in claim 16, where each transmission of the plurality of transmissions comprises sensor data collected via one or more sensors of the sensor device.

18. The method for controlling deployment of sensor devices over wireless networks as recited in claim 17, where the data is based at least in part on the sensor data.

19. The method for controlling deployment of sensor devices over wireless networks as recited in claim 18, where the data comprises the sensor data.

20. The method for controlling deployment of sensor devices over wireless networks as recited in claim 19, where the first electronic communication corresponds to a synchronization message that comprises an indication of a capacity of the gateway device.

\* \* \* \* \*